July 10, 1962 M. P. LAUGHLIN 3,043,482
CHEMICAL FEEDER
Filed May 4, 1959
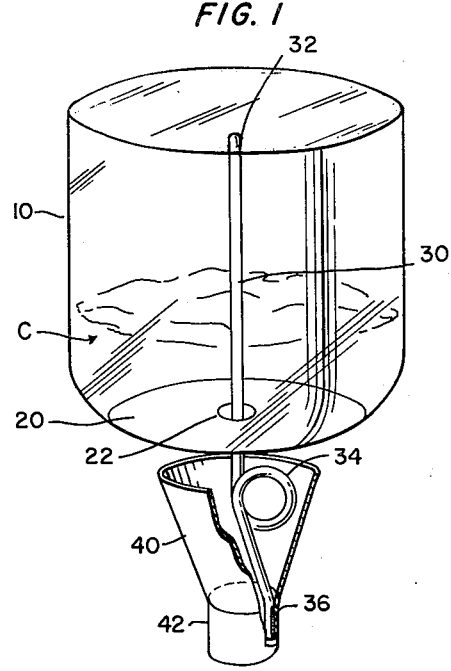
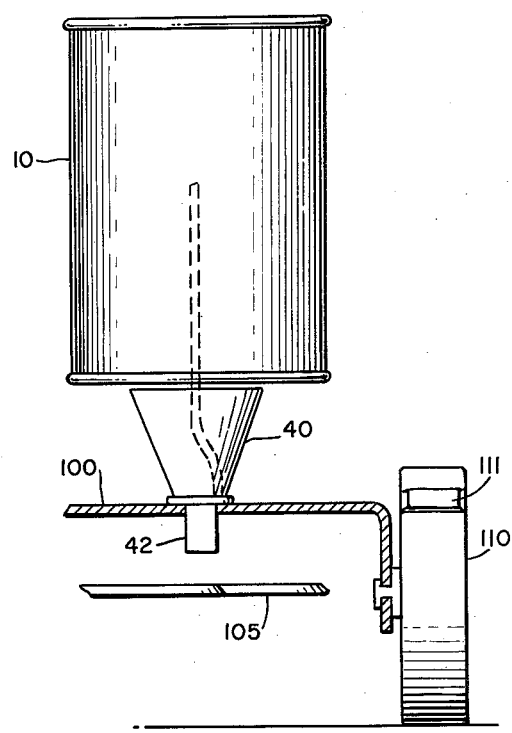
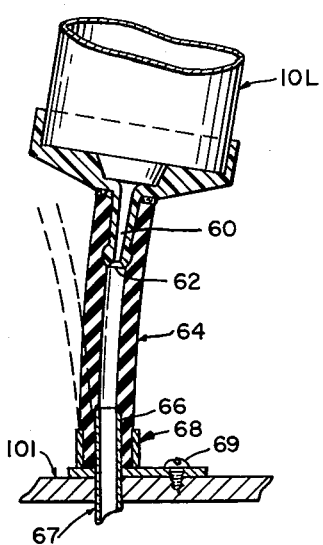
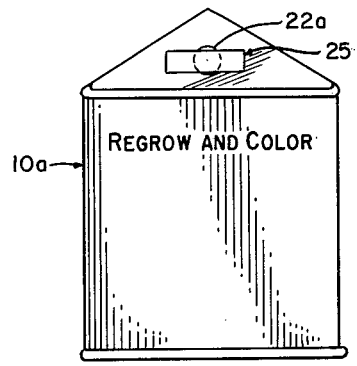
INVENTOR
MYRON P. LAUGHLIN
BY  *Moses, Nolte & Nolte*
ATTORNEYS.

3,043,482
CHEMICAL FEEDER
Myron P. Laughlin, 1705 Beach Drive SE.,
St. Petersburg, Fla.
Filed May 4, 1959, Ser. No. 810,947
2 Claims. (Cl. 222—161)

This invention relates to the distribution of plant growth chemicals.

It is a purpose of this invention to provide simple and inexpensive means whereby chemicals in dry and liquid form may be distributed evenly over a given plant growth area.

It is an object of this invention to provide plant growth chemical distribution means whereby concentrated basic chemicals may be distributed over plant growth areas, such as turfs, without drift problems and without affecting other growths not in the given area.

It is a purpose of this invention to provide simple distributing means which will automatically proportion feed of plant growth chemicals to the motion of the vehicle carrying the distributor so that feed will be substantially even and in a predetermined ratio to the area covered by the vehicle.

The distribution of plant growth chemical, particularly on lawn areas, has heretofore presented concentration problems and spot damage rendering it necessary for the plant growth chemical manufacturer to add to the chemicals a large volume of inert material as distribution means to dilute against possible careless application by the user since the chemicals themselves were far too strong, unless widely dispersed. Thus, it is common to read on a fertilizer package that up to 80 percent inert material is included with the active chemical. Consideration will show that this has involved multiplied initial, as well as, transportation costs and added to the application cost without contributing other than an expensive means of dispersion. The present invention provides such accurate mechanical dispersion at the point of application and is, therefore, able to remove the need for such inert material and its attendant expense. It places in the hands of the user a small, concentrated, all chemical package, easily carried and stored for his use. It further provides that chemical distribution will be automatically independent of the user's skill and judgment and may be preset by the plant growth chemical producer to optimum application rates.

It is the primary purpose of this invention to provide means for all of the above purposes through a device so simple in construction and low in cost of production that it will not add substantially to the cost of the plant growth chemical and may be dispersed with the chemical package without substantial added consideration. A further part of this primary object is that the means disclosed herein will be in such form that the requisite chemicals may be bought and applied through sealed containers which are not punctured until the container is to be put to actual use; thus preventing human contact with herbicides and the like.

FIG. 1 is a vertical diagrammatic view of the embodiment of my invention.

FIG. 2 is a vertical view of the actual structure involved for the embodiment of FIG. 1, as attached to a rotary lawn mower.

FIG. 3 shows a type of container which may be utilized with the device of FIG. 2.

FIG. 4 is a view taken in vertical elevation, and mainly in section, of a simplified form of my invention.

Referring now to FIG. 1, 10 represents a container suited to hold a body or mass of chemicals C and having as its lower closure an orifice disk 20 provided with the orifice 22 through which projects agitator rod 30. Agitator rod 30 may project upwardly as at 32 to support the whole container 10, or the weight of such container and its chemical may be borne by the orifice plate 20 bearing upon funnel 40, as shown in FIG. 2. In FIG. 1, agitator rod 30 is preferably coiled for resilience, as at 34, before being secured to funnel 40's neck 42, as at 36. Funnel 40 projects downward through the mower casing 100, as shown in FIG. 2, and neck tube 42 discharges above rotary cutter 105, as shown. Container 10 is thus attached to funnel 40 only through resilient means, and the mass of the material C is free to respond to kinetic and inertia forces set up therein by the motions of the container and of its supporting vehicle 100, as such vehicle moves over the terrain. The motion of the supporting vehicle 100 may be amplified where necessary by the attachment of jolting lugs 111 to the vehicle wheels 110 (shown in FIG. 2), but normally the motion of the upsprung vehicle is sufficient to cause agitator rod 30 to move about in the chemical C and in the orifice 22, so that while the orifice is normally plugged by the stationary weight and mass of the chemical C, upon motion of the supporting vehicle, the moving weight of the container and its contents causes agitator rod 30 to promptly open the orifice 22 and to feed the chemical continuously therethrough so long as motion continues, thus providing a simple valve and agitating means sufficient for the purpose but without complicated mechanism or added expense.

The container 10 may assume any irregular outward form desired for advertising or convenience purposes, as for instance, the triangular form shown in FIG. 3. In FIG. 3 the container 10*a* is shown with its orifice 22*a* upward, as the container would be offered for storage and sale. The orifice 22*a* is here shown as covered by a removable seal 25 which can be taken away when the container is to be put into use or may be punctured by the agitator rod at the instant of application, if desired. In this last instance, orifice 22*a* will be promptly cleared by the agitator rod, as the vehicle goes into use.

The embodiments shown in FIGS. 1, 2 and 3 will be understood as particularly adaptable to basic chemicals in dry or granular form and to the distribution of seeds when such is to be made. FIG. 4 shows a further simplified form wherein container 10L is preferably a tubular body having a discharge nozzle 60 provided with an orifice 62. In this instance, a satisfactory resilient mounting may be embodied in a section of resilient rubber tubing 64, one of whose ends receives nozzle 60, and the other of whose ends slides over and is secured o a tube 66 mounted through bracket 68 to the mower casing 101 through which tube 66 extends as at 67. Bracket 68 is secured to the casing by the metal screw 69. An agitator rod is not usually essential to this structure, since the forces set up in the liquid in container 10L by its movements on resilient tube 64 are sufficient to propel the liquid through the nozzle and the orifice 62, as the container moves about when the mower is in operation. A requisite valve effect is here obtained by making container 10L air tight so that atmospheric pressure prevents outflow from the nozzle except when mechanical forces generated in the liquid mass forces the liquid from the container against atmospheric pressure as previously described. Thus, it will be evident that the essentials employed in this modification are substantially the same as has been described for the earlier modification, and that all of the essential functions of agitation and feed have been accomplished, i.e. automatic feeding of plant growth chemicals.

Manifestly, many other modifications may be made in the specific structure without departure from the spirit of this invention, and without interfering with the essential functions accomplished thereby; all within the scope

What I claim is:

1. A plant growth chemical feeder for agricultural implement having plant cutting means including a mounting attachment for mounting on the implement frame, said attachment having a passage therethrough for discharging the material to be fed adjacent to the cutting means of the implement, agitator means including a rod carried by said mounting attachment and projecting upward above said passage, and a chemical container having a metering aperture at its lower end loosely engaging said agitator rod, said rod extending into the interior of said container, said container being resiliently supported by said mounting attachment whereby the moving weight of said container and its contents agitate the chemicals contained in said container and cause discharge thereof through said aperture and the passage through said mounting attachment.

2. A plant growth chemical feeder for agricultural implement having plant cutting means including a mounting attachment for mounting on the implement frame, said mounting attachment being in the form of a funnel having a wide mouth and a passage therethrough for discharging the material to be fed adjacent to the cutting means of the implement, agitator means including a rod carried by said mounting attachment and projecting upwardly through said funnel and above the same, and a chemical container having a metering aperture at its lower end loosely engaging said agitator rod, said rod extending into the interior of said container, said metering aperture being located above the mouth of said funnel so as to discharge the material in the container into said funnel, said container being resiliently supported by said mounting attachment whereby the moving weight of said container and its contents agitate the chemicals contained in said container and cause discharge thereof through said aperture and funnel.

References Cited in the file of this patent

UNITED STATES PATENTS

| | | |
|---|---|---|
| 1,137,560 | Wenman | Apr. 27, 1915 |
| 1,714,281 | Spring | May 21, 1929 |
| 2,308,735 | Zahn | Jan. 19, 1943 |
| 2,742,751 | Laughlin | Apr. 24, 1956 |